United States Patent [19]
Plyler

[11] 3,894,515
[45] July 15, 1975

[54] ANIMAL LOADING ANDD UNLOADING APPARATUS

[76] Inventor: Isom Franklin Plyler, Rt. 2, Monroe, N.C. 28110

[22] Filed: Dec. 14, 1973

[21] Appl. No.: 424,868

[52] U.S. Cl. ................................. 119/82; 14/71
[51] Int. Cl. ............................................ A01k 29/00
[58] Field of Search ................... 14/71, 72; 119/82

[56] References Cited
UNITED STATES PATENTS

| | | | |
|---|---|---|---|
| 350,787 | 10/1886 | Watson et al. | 14/71 X |
| 365,657 | 6/1887 | Watson et al. | 14/72 X |
| 378,319 | 2/1888 | Keenan | 14/71 X |
| 595,643 | 12/1897 | Mohler et al. | 14/72 X |
| 2,639,450 | 5/1953 | Ramer | 14/71 |
| 2,881,457 | 4/1959 | Rodgers | 14/71 |
| 3,302,339 | 2/1967 | White | 14/71 X |
| 3,409,923 | 11/1968 | Walker | 14/71 |
| 3,599,382 | 8/1971 | Stone | 14/71 X |
| 3,694,839 | 10/1972 | Loblick | 14/71 |
| 3,694,840 | 10/1972 | Loblick | 14/71 |

Primary Examiner—Nile C. Byers, Jr.
Attorney, Agent, or Firm—Parrott, Bell, Seltzer, Park & Gibson

[57] ABSTRACT

An apparatus for facilitating loading and unloading animals from the rear of wheeled vehicles comprises a loading platform which is positioned in a roadway and adapted for a wheeled vehicle to pass thereover. The loading platform comprises a main platform having one end pivotally mounted in the roadway to permit raising the main platform from a horizontal position in the roadway after a vehicle has passed thereacross and stopped adjacent thereto, to an inclined position adjacent the rear end of the stopped vehicle. An auxiliary platform is provided at the raised end of the main platform and is adapted to be extended therefrom to bridge any gap between the main platform and the rear end of the stopped vehicle.

16 Claims, 11 Drawing Figures

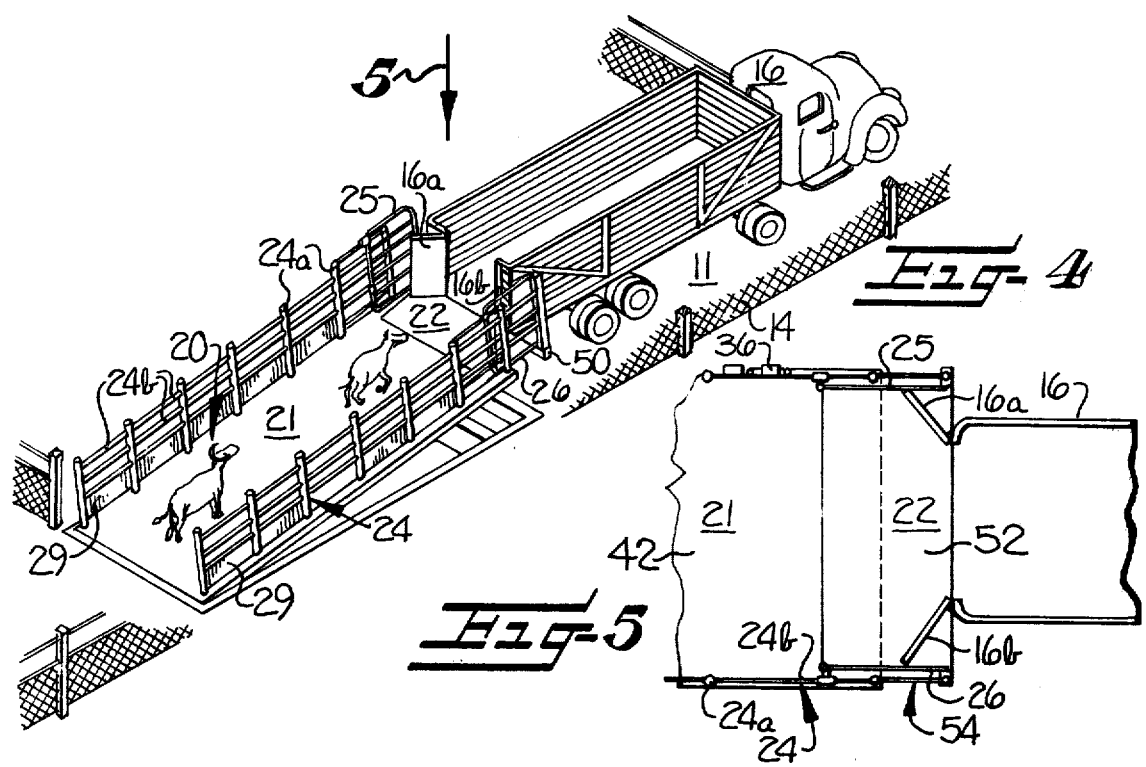
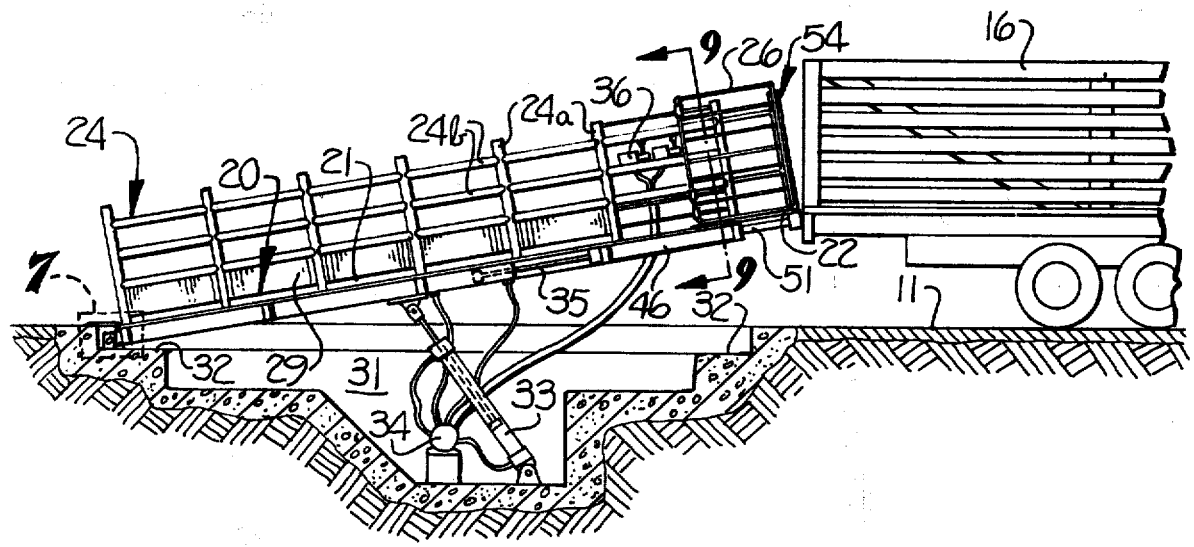
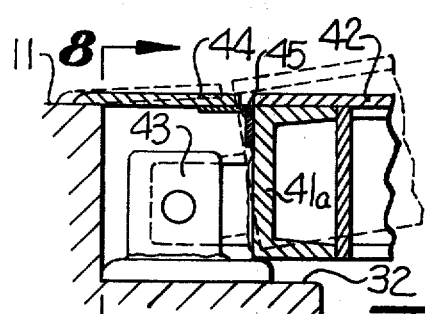
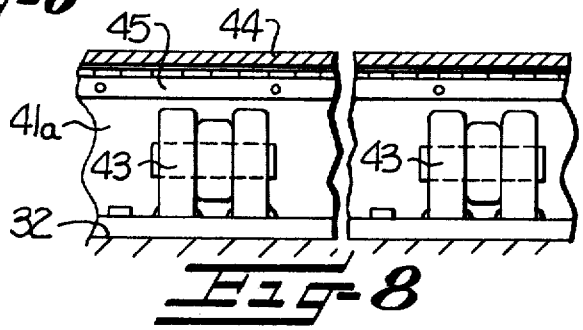

ANIMAL LOADING AND UNLOADING APPARATUS

This invention relates to animal handling, and more particularly to an apparatus adapted for use in stockyards for facilitating loading or unloading animals from wheeled vehicles such as trucks.

Animals such as cattle and the like are conventionally transported to and from a stockyard in vehicles of various types such as trucks or trailers. Such vehicles may range in size from small pick-ups to large semitrailers, many of which are tiered with animals being carried on two levels. To facilitate loading and unloading the animals from the various types of vehicles, stockyards have been conventionally provided with a series of stationary ramps or loading docks of various fixed heights.

A truck driver preparing to unload the animals from his truck or to load the same must select the loading dock of the proper height corresponding to the height of the cargo bed of his truck and then back the truck to the dock and stop with the rear end of the truck abutting the dock. Obviously, this is time consuming and presents a traffic problem when a large number of trucks are being loaded or unloaded. Additionally, the necessity of backing the truck to the loading dock often results in damaging the rear end of the truck or the loading dock.

With the foregoing in mind it is an object of the present invention to provide an apparatus for loading or unloading animals from wheeled vehicles, which apparatus is particularly adapted for use with vehicles of various sizes and types.

It is another object of the invention to provide an apparatus for facilitating loading or unloading animals from a variety of vehicles and which is particularly adapted for accommodating successive vehicles in a quick and efficient manner.

It is still another object of the invention to provide an apparatus of the type described wherein it is not necessary to back the vehicles to the apparatus for loading or unloading the animals at the rear end thereof.

It has been found that the above objects may be accomplished by providing a loading platform in a roadway adapted for vehicles to pass thereover with the loading platform comprising a main platform having one end thereof pivotally mounted for permitting raising the main platform from a horizontal position in the roadway after a vehicle has passed thereacross and stopped adjacent thereto to an inclined position adjacent the rear end of the stopped vehicle. The loading platform also comprises an auxiliary platform carried by the raised end of the main platform and adapted for being extended therefrom to bridge any gap between the main platform and the rear end of the stopped vehicle. Preferably, fencing is provided along opposite sides of the main platform to facilitate directing the animals along the platform during loading or unloading and a pair of opposing gates is provided adjacent the raised end of the platform with the gates being adapted for being pivotally moved toward and away from each other to facilitate loading or unloading animals from a variety of types of vehicles.

Some of the objects and advantages of the invention having been stated, others will appear as the description proceeds when taken in connection with the accompanying drawings, in which:

FIG. 4 is a perspective view similar to FIG. 2 showing the apparatus in raised position and being used for loading cattle onto a cattle truck of the type having doors provided at the rear end thereof;

FIG. 5 is a top plan view of a portion of the apparatus, as viewed from the arrow 5 in FIG. 4;

FIG. 6 is a sectional view of the apparatus looking from the side thereof;

FIG. 7 is a detailed view of that portion of the apparatus shown within the dashed lines 7 of FIG. 6;

FIG. 8 is a fragmentary sectional view taken substantially along line 8—8 of FIG. 7;

Figure 1:
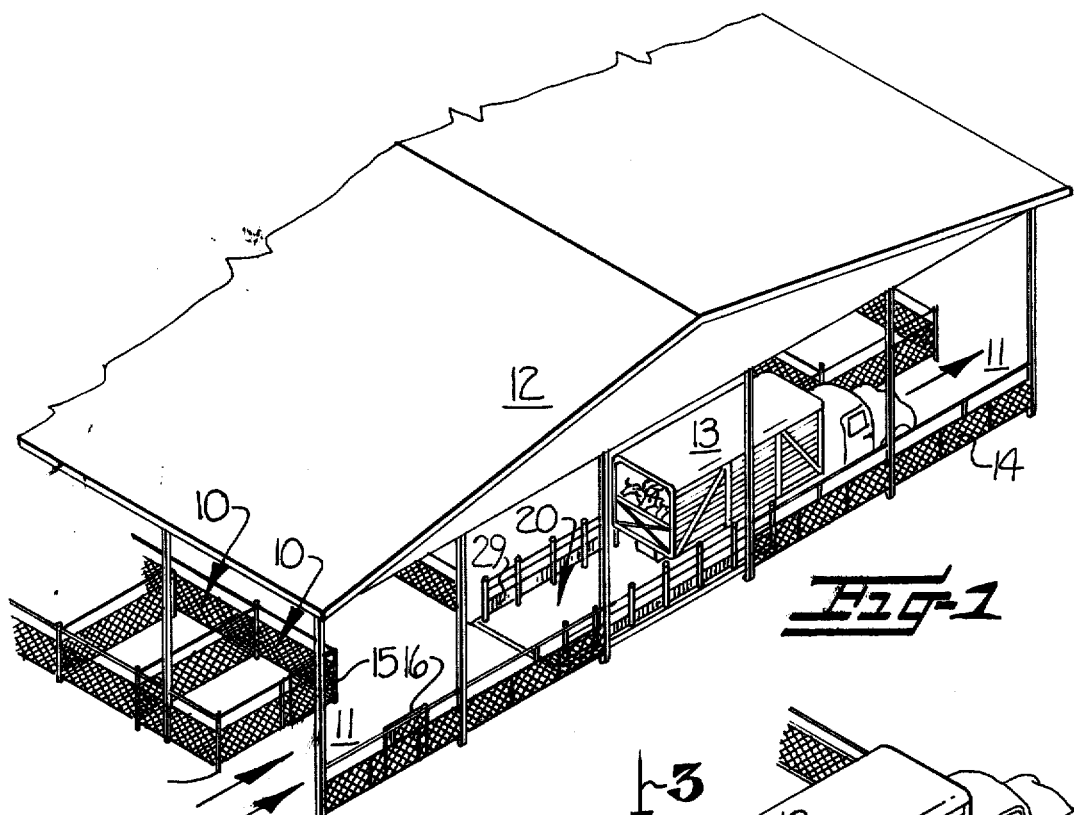
FIG. 1 is a perspective view of a portion of a stockyard being provided with an apparatus in accordance with the present invention, and wherein the apparatus is shown in the lowered position with a cattle truck being driven forwardly thereacross.
Figure 2:
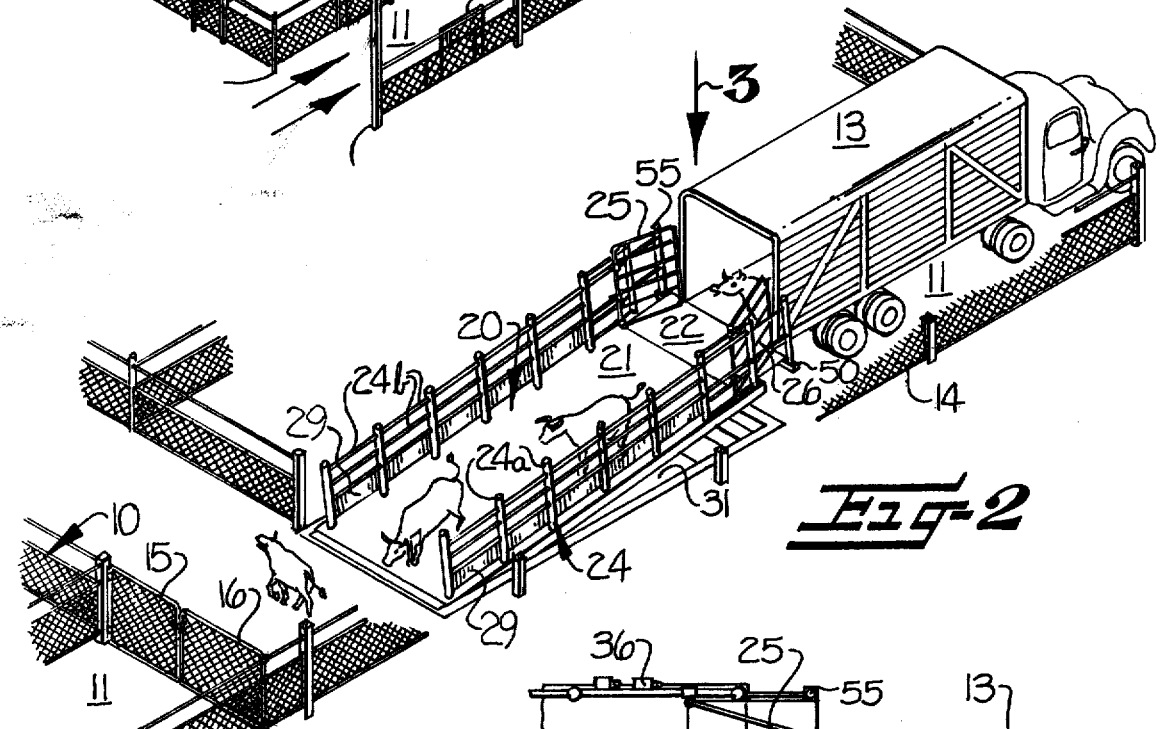
FIG. 2 is a perspective view similar to FIG. 1 showing the apparatus in raised position and being used for unloading cattle at the rear of a cattle truck.

Referring now more particularly to the drawings, the invention is illustrated in FIGS. 1 and 2 as being installed in a livestock yard for facilitating unloading cattle or other animals being delivered by wheeled vehicles to the livestock yard. The stockyard illustrated includes a number of fenced animal pens, broadly designated at 10, and a roadway 11 located adjacent pens 10 along which the vehicles are driven when delivering cattle to the stockyard. As illustrated, a roof 12 is provided over pens 10 and roadway 11 to provide a sheltered area for unloading the cattle.

A loading platform, broadly indicated at 20, is located in the roadway 11 and is adapted for facilitating loading or unloading the animals from the vehicles. More specifically, as seen in FIGS. 2, 4 and 6, the loading platform comprises a main platform 21 having one end thereof pivotally mounted in the roadway so that the platform may be raised from a horizontal position in the roadway to an inclined position after a vehicle has been driven forwardly across the platform and stopped with the rear end of the vehicle located adjacent main platform 21. Loading platform 20 also includes an auxiliary platform 22 which is carried by the opposite end of main platform 21 and is adapted to be extended therefrom to bridge any gap between the main platform and the rear end of the stopped vehicle. The loading platform 20 is illustrated as being about ten to ten and one-half feet wide, sufficient to permit highway vehicles to pass thereover, and is adapted to lie substantially flush in the roadway to facilitate the passage of the vehicles thereacross.

The operation of the loading platform is best understood from viewing FIGS. 1 and 2. As shown in FIG. 1, a cattle truck 13 is arriving at the livestock yard and loading platform 20 is in a horizontal position in the roadway to permit the cattle truck to drive forwardly thereacross. The auxiliary platform 22 (not visible in FIG. 1) is in fully retracted position. After the cattle truck 13 is driven across the main platform 21, it is stopped with the rear end thereof adjacent the loading platform and main platform 21 is pivotally raised to an inclined elevated position corresponding substantially to the height of the cargo bed of the truck. Thereafter, auxiliary platform 22 is extended from the main platform to bridge any gap between the main platform and the rear end of the stopped cattle truck. Auxiliary platform 22 allows considerable flexibility as to where the truck may be stopped, since the auxiliary platform is easily extended for any short distance required. This is particularly helpful to the truck driver, since it is often difficult, particularly on large trucks, to determine exactly where the rear end of the truck is stopped. It is readily apparent that backing of the truck is not required when using this loading platform for loading or unloading. Thus, the platform is particularly useful for loading or unloading trailers which are difficult to maneuver in a backward direction into narrow or restricted spaces.

As illustrated, the main platform 21 is provided with fencing, generally indicated at 24, along opposite sides thereof to facilitate directing the cattle down the platform during unloading. Additionally, fencing 14 is provided alongside roadway 11 both forwardly and rearwardly of the loading platform 20 to facilitate guiding cattle trucks to and from the loading platform and also to facilitate guiding the unloaded cattle away from the loading platform. Additionally, a pair of gates 15, 16 is provided at the entrance end of the roadway 11. Gates 15, 16 are closed during unloading to direct the cattle between truck 13 and the cattle pens 10. After unloading, loading platform 20 is lowered and truck 13 is driven away forwardly. Gates 15, 16 are then opened and another truck is able to be quickly driven forwardly into position for being unloaded.

A pair of gates 25, 26 is provided at the raised end of the main platform which also serve for guiding or directing the cattle from truck 13 along loading platform 20. Gates 25, 26 are carried on opposite sides of the main platform by fencing 24 and are pivotally mounted to permit either blocking the passageway at the raised end of the platform or opening the same, as desired.

Figure 3:
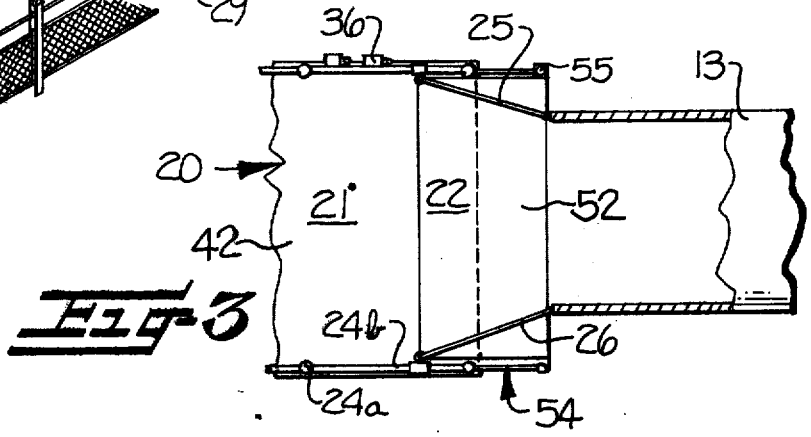
FIG. 3 is a top plan view of a portion of the apparatus, as viewed from the arrow 3 in FIG. 2.

As illustrated in FIGS. 2 and 3, cattle truck 13 is considerably narrower than the width of the loading platform 20. The rear door of truck 13 is illustrated as being removable to permit unloading cattle from the truck. When unloading a truck of this type, gates 25, 26 are positioned at an angle inwardly to adjustably restrict the width of the passageway at the raised end of the loading platform and to close the gap between the sides of the truck 13 and the fencing 24 on main platform 21.

The versatility of the loading platform is apparent from viewing FIGS. 4 and 5. Here, loading platform 20 is illustrated as being employed for loading cattle onto a cattle truck 16 wherein the rear of the truck is provided with doors 16a, 16b which swing open outwardly from the rear of the truck. When used for loading or unloading trucks of this type, gates 25, 26 are positioned in fully opened position parallel to the fencing 24 and the doors 16a, 16b serve to bridge any gap between the sides of the truck and the loading platform.

It should be apparent that loading platform 20 may be employed for unloading vehicles of any width, height or door arrangement, including pick-up trucks, large semitrailers, and small animal trailers pulled by a truck or car. The loading platform is also useful for loading or unloading small animals from trucks of the type wherein the animals are carried in multiple tiers or levels in the truck. The loading platform may be easily raised to the required height so as to unload the animals from any desired level or tier.

Referring now to FIG. 6, the construction of loading platform 20 will be described in more detail. Loading platform 20 is illustrated as being pivotally mounted in a pit 31 provided in roadway 11. Pit 31 is provided with a shallow recessed flange portion 32 around the perimeter thereof upon which the loading platform rests when in lowered position so that the upper surface of the platform is at substantially the same level as the surface of roadway 11. Pit 31 is also provided with a deeper recessed portion in the central area thereof for accommodating the machinery used for lowering and raising the platform and for extending the same.

As illustrated, a pair of fluid cylinders 33, preferably hydraulic, are connected between main platform 21 and the bottom of the recessed portion of pit 31 for pivotally raising and lowering the main platform. A fluid pump 34, also located in pit 31, is provided for operating the cylinders. Another pair of fluid cylinders 35 are operatively connected between main platform 21 and auxiliary platform 22 for extending and retracting the auxiliary platform. Controls 36, of a conventional type, are located adjacent the raised end of main platform 21 and are operatively connected to the fluid system for starting and stopping the pump 34 and for controlling operation of fluid cylinders 33 and 35.

Figure 9:
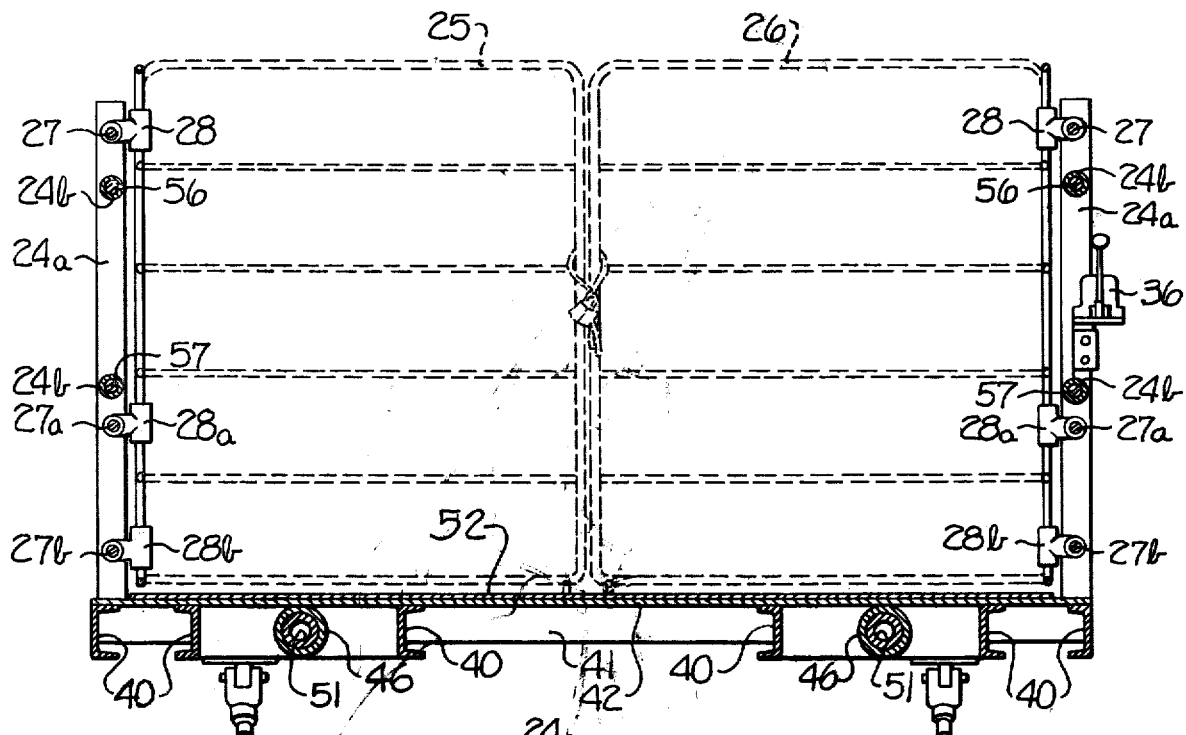
FIG. 9 is a sectional view of the apparatus taken substantially along line 9—9 of FIG. 6, and shown with the gates in closed position by dashed lines.
Figures 10, 11:
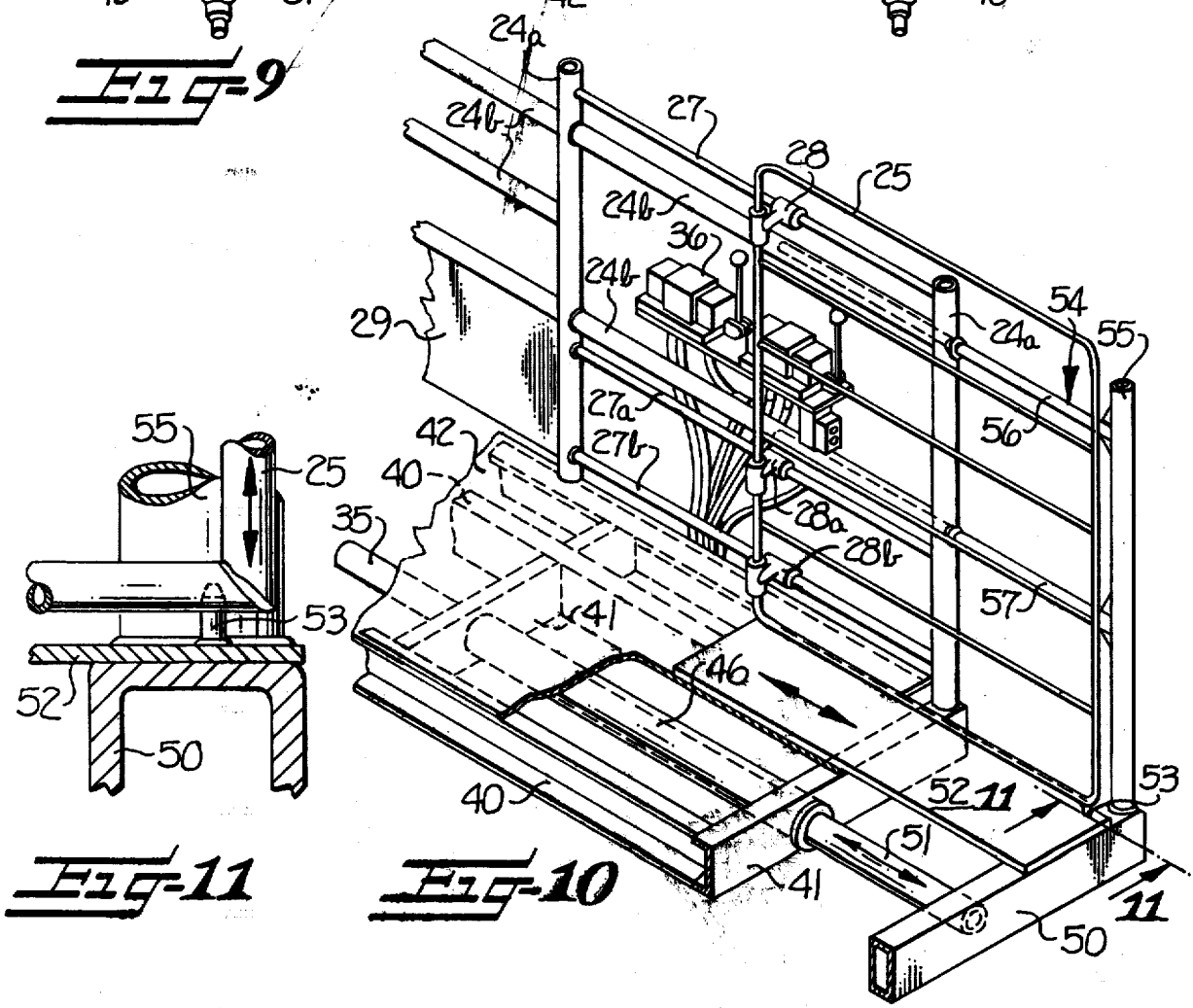
FIG. 10 is a detailed fragmentary perspective view, with parts broken away, of the upper end of the apparatus.
FIG. 11 is a detailed fragmentary sectional view taken substantially along line 11—11 of FIG. 10.

Referring now to FIGS. 9 and 10, main platform 21 includes a frame formed by longitudinally and transversely extending beams, 40 and 41 respectively, which are preferably of a generally U-shaped cross section. Main platform 21 also includes a decking 42, preferably of plate steel of the type having a traction surface provided thereon.

A plurality of spaced apart hinged members 43 (FIGS. 7 and 8) are anchored to flange portion 32 of pit 31 and to the endmost transversely extending beam 41a at the end of main platform 21 to permit pivotally raising the platform in the roadway. Additionally, a bridge plate 44 is hingedly secured along one side thereof, preferably by a piano type hinge 45 as illustrated, to the upper corner of transverse beam 41a. The opposite side of bridge plate 44 is rounded and is positioned overlying roadway 11 to provide a smooth junction between the roadway 11 and main platform 21. Since the hinge point or pivotal axis of main platform 21 is below the upper surface of the platform, bridge plate 44 is adapted to shift horizontally when platform 21 is pivotally raised, as the dashed lines in FIG. 7 illustrate, so as to avoid leaving any gap between the roadway 11 and the main platform 21.

As illustrated in FIG. 10, auxiliary platform 22 is carried at the upper end of main platform 21 and comprises a transversely extending hollow beam member 50 and a pair of longitudinally extending shafts 51. Shafts 51 have one end thereof connected to beam 50 and are each journaled for sliding longitudinal movement in a cooperating hollow tubular sleeve member 46 which is secured to the frame of main platform 21. The opposite ends of shafts 51 are operatively connected to fluid cylinder 35 for imparting longitudinal sliding movement to the shafts 51 and thereby extending or retracting the auxiliary platform 22. A decking 52, preferably of steel plate, is secured to transverse beam member 50 and is positioned overlying the decking 42 at the upper end of main platform 21. The length of decking 52 is greater than the maximum longitudinal extent of auxiliary platform 22 so that even when the auxiliary platform is in fully extended position, a portion of the decking 52 will overlie the decking 42 at the upper end of main platform to provide a smooth, sturdy junction therebetween. When the auxiliary platform 22 is in fully retracted position, the decking 52 thereof will substantially entirely overlie the decking 42 on main platform 21.

Referring now to the fencing 24 provided on main platform 21, it will be seen that the fencing includes a plurality of spaced upstanding post members 24a with adjacent post members being interconnected by horizontal rail members 24b, of hollow tubular construction. Additionally, a kick plate 29 is provided enclosing the space between lowermost horizontal rail member 24b and the decking 42 of the main platform to prevent injury to the animals being loaded or unloaded due to tripping on the side of the ramp or partially falling therefrom.

Referring to FIG. 10, it will be seen that the last section of fencing at the raised end of main platform 21 includes, in addition to two horizontal rail members 24b, three horizontally extending supplementary rail members 27, 27a, 27b of smaller diameter than rail members 24b. The gates 25, 26 at the upper end of main platform are secured to supplementary rails 27, 27a, 27b by means of sliding hinge members 28, 28a, 28b. As illustrated, hinge members 28, 28a, 28b have perpendicularly oriented hollow tubular sleeve portions at each end thereof, with one sleeve portion being oriented on a vertical axis and having a vertically extending side rail of one of the gates 25, 26 hingedly carried thereby. The other sleeve member is mounted surrounding one of the supplementary rails 27, 27a, 27b and is adapted for longitudinal sliding movement with respect thereto to permit each of the gates 25, 26 to slide outwardly and inwardly together with the auxiliary platform 22. As illustrated in FIG. 11, short upstanding post members 53 at opposite sides of the outermost end of auxiliary platform 22 are adapted to be positioned in a hole in the lower side of the bottom rail of gates 25, 26 when the gates are in fully opened position so that the gates and the auxiliary platform will move together as a unit.

This sliding hinge arrangement facilitates maintaining the outer ends of gates 25, 26 in the same position substantially coextensive with the outer end of auxiliary platform 22 while the auxiliary platform is being extended or retracted. This sliding hinge arrangement also facilitates adjusting the gates so as to close any gap between the sides of a truck and the fencing 24 carried by the main platform 21 regardless of whether auxiliary platform 22 is in extended or retracted position. The hinge arrangement also permits positioning the outer ends of the gates 25, 26 so as to extend outwardly beyond the outer end of the auxiliary platform, when desired, for facilitating unloading certain types of vehicles.

Auxiliary platform 22 is provided with fencing, generally indicated at 54, along opposite sides thereof, with the fencing being adapted to cooperate with the fencing 24 on main platform 21 for defining continuous fencing along opposite sides of the entire loading platform 20. Fencing 54 includes an upstanding post member 55 positioned at each side of the auxiliary platform and carried by opposite ends of transverse beam member 50. Fencing 54 also includes a pair of horizontally extending rail members 56, 57 positioned along each side of the auxiliary platform with each rail member 56, 57 having one end thereof secured to post member 55 and having the opposite end thereof telescopically received within the corresponding horizontally extending tubular rail members 27a, 27b on the main platform 21. Thus, when the auxiliary platform is in fully retracted position, rail members 56, 57 are substantially entirely telescopically received within the corresponding hollow rail members 27a, 27b on main platform 21 and are extended outwardly therefrom when auxiliary platform 22 is in extended position.

Although the invention has been illustrated and described with specific reference to loading and unloading animals at a stockyard, numerous other uses for the present invention will be readily apparent from the foregoing description.

In the drawings and specification, there has been set forth a preferred embodiment of the invention and although specific terms are employed, they are used in a generic and descriptive sense only and not for purposes of limitation.

That which is claimed is:

1. Apparatus for facilitating the loading and unloading of animals from wheeled vehicles stopped in a roadway, said apparatus comprising a relatively narrow roadway of a width sufficient to permit large wheeled vehicles, such as cattle trucks, to successively pass forwardly therealong in a common direction for being loaded or unloaded, a pit in said roadway in the path of said vehicles, said pit having inwardly extending horizontal flange portions along the sides thereof recessed from the level of said roadway, a loading platform overlying said pit and being normally horizontally positioned substantially flush with said roadway and supportingly carried by said flange portions for bearing the weight of the heavy wheeled vehicles passing forwardly thereacross, said loading platform comprising a main platform having the end thereof first crossed by the forwardly approaching vehicles being pivotally mounted in said pit for permitting raising the main platform from said normal horizontal position in the roadway after a vehicle has passed forwardly thereacross and stopped on said roadway adjacent the opposite end of said main platform, to an adjustable inclined elevated position adjacent the rear end of the stopped vehicle, said loading platform also comprising an auxiliary platform slideably carried by said opposite end of said main platform and adapted to be adjustably longitudinally extended therefrom to bridge any gap between the main platform and the rear end of the stopped vehicle, means operatively connected to said loading platform for pivotally raising the same a desired amount from a horizontal position in the roadway to an adjustable inclined elevated position corresponding substantially to the height of the cargo bed of the stopped vehicle, means operatively connected to said auxiliary platform for adjustably extending the same longitudinally outwardly beyond the main platform to bridge any gap between the main platform and the stopped vehicle, and fencing provided alongside the roadway both forwardly and rearwardly of said loading platform for guiding the wheeled vehicles forwardly along the roadway and across said loading platform and for guiding the animals onto or away from said loading platform.

2. Apparatus according to claim 1 wherein fencing is provided along opposite sides of said main platform to facilitate directing the animals along the platform during the loading and unloading thereof.

3. Apparatus according to claim 2 wherein a pair of opposing gates is provided adjacent said opposite end of said main platform, said gates being pivotally mounted along opposite sides of said platform and adapted for being pivotally moved toward and away from each other to facilitate loading and unloading animals from a variety of types of vehicles.

4. Apparatus according to claim 3 wherein pivotal mounting means are provided interconnecting the respective gates with said fencing for pivotally mounting said gates along opposite sides of said platform.

5. Apparatus according to claim 4 wherein said pivotal mounting means interconnecting said gates and said fencing are slideably carried by said fencing to permit longitudinal sliding movement of said gates with respect to said fencing.

6. Apparatus according to claim 1 wherein said means for pivotally raising said loading platform and said means for extending said auxiliary platform outwardly beyond said main platform each comprise fluid cylinder means, and wherein control means for operating both of said fluid cylinder means is carried by said main platform adjacent said other end thereof.

7. Apparatus according to claim 1 wherein a plurality of animal pens are located adjacent said loading platform and wherein said fencing is also adapted for directing the animals moving therebetween.

8. Apparatus for facilitating the loading and unloading of animals from wheeled vehicles stopped in a roadway, said apparatus comprising a loading platform positioned in the roadway and across which vehicles are adapted to pass, said loading platform comprising a main platform having one end thereof pivotally mounted for permitting raising the platform from a horizontal position in the roadway after a vehicle has passed thereacross and stopped adjacent thereto, to an inclined position adjacent the rear end of the stopped vehicle, said loading platform also comprising an auxiliary platform slideably carried by the other end of said main platform and adapted for being longitudinally extended therefrom to bridge any gap between the main platform and the rear end of the stopped vehicle, means operatively connected to said loading platform for pivotally raising the same a desired amount from a horizontal position in the roadway to an inclined elevated position corresponding substantially to the height of the cargo bed of the stopped vehicle, means operatively connected to said auxiliary platform for extending the same longitudinally outwardly beyond the main platform to bridge any gap between the main platform and the stopped vehicle, fencing provided along opposite sides of said main platform to facilitate directing the animals along the platform during loading or unloading, a pair of opposing gates provided adjacent said other end of said main platform, pivotal mounting means slideably carried by said fencing and interconnecting said gates and said fencing, said pivotal mounting means being adapted for permitting pivotal movement of said gates toward and away from each other to facilitate loading and unloading animals from a variety of types of vehicles and also being adapted for permitting longitudinal sliding movement of said gates with respect to said fencing to permit the gates to be adjustably positioned longitudinally of the loading platform for bridging any gap between the loading platform and the sides of a stopped vehicle, and means provided on said auxiliary platform for engaging said gates for causing longitudinal sliding movement of said gates together with said auxiliary platform when the auxiliary platform is extended from said main platform.

9. Apparatus for facilitating the loading and unloading of animals from wheeled vehicles stopped in a roadway, said apparatus comprising a relatively narrow roadway of a width sufficient to permit large wheeled vehicles, such as cattle trucks, to successively pass forwardly therealong in a common direction for being loaded or unloaded, a pit in said roadway in the path of said vehicles, said pit having inwardly extending horizontal flange portions along the sides thereof recessed from the level of said roadway, a loading platform overlying said pit and being normally horizontally positioned substantially flush with said roadway and supportingly carried by said flange portions for bearing the weight of the heavy wheeled vehicles passing forwardly thereacross, said loading platform comprising a main platform having the end thereof first crossed by the forwardly approaching vehicles being pivotally mounted in said pit for permitting raising the main platform from said normal horizontal position in the roadway after a vehicle has passed forwardly thereacross and stopped on said roadway adjacent the opposite end of said main platform to an adjustable inclined elevated position adjacent the rear end of the stopped vehicle, said loading platform also comprising an auxiliary platform slideably carried by said opposite end of said main platform and adapted for being adjustably longitudinally extending therefrom to bridge any gap between the main platform and the rear end of the stopped vehicle, means operatively connected to said loading platform for pivotally raising the same a desired amount from a horizontal position in the roadway to an adjustable inclined elevated position corresponding substantially to the height of the cargo bed of the stopped vehicle, means operatively connected to said auxiliary platform for adjustably extending the same longitudinally outwardly beyond the main platform to bridge any gap between the main platform and the stopped vehicle, fencing provided along opposite sides of said main platform to facilitate directing the animals along the platform during loading or unloading, fencing provided along opposite sides of said roadway both forwardly and rearwardly of said loading platform for guiding the wheeled vehicles forwardly along the roadway and across said loading platform and for guiding the animals onto or away from said loading platform, a pair of opposing gates provided adjacent said opposite end of said main platform, and pivotal mounting means interconnecting said gates and said fencing and being adapted for permitting pivotal movement of said gates toward and away from each other to facilitate loading and unloading animals from a variety of types of vehicles.

10. Apparatus according to claim 9 wherein said pivotal mounting means is slideably carried by said fencing the permit longitudinal sliding movement of said gates with respect to said fencing, said gates being thereby adapted for being adjustably positioned longitudinally of the loading platform for bridging any gap between the loading platform and the sides of a stopped vehicle.

11. Apparatus according to claim 9 wherein said auxiliary platform includes a plate member defining the upper surface thereof, said plate member being positioned overlying said other end of said main platform and being adapted for longitudinal sliding movement thereover when said auxiliary platform is extended longitudinally outwardly beyond said main platform.

12. Apparatus according to claim 9 wherein fencing is provided along opposite sides of said auxiliary platform cooperating with the fencing on said main platform for defining continuous fencing along opposite sides of the loading platform.

13. Apparatus for facilitating the loading and unloading of animals from wheeled vehicles stopped in a roadway, said apparatus comprising a relatively narrow roadway of a width sufficient to permit large wheeled vehicles, such as cattle trucks, to successively pass forwardly therealong in a common direction for being loaded or unloaded, a pit in said roadway in the path of said vehicles, said pit having inwardly extending horizontal flange portions along the sides thereof recessed from the level of said roadway, a loading platform overlying said pit and being normally horizontally positioned substantially flush with said roadway and supportingly carried by said flange portions for bearing the weight of the heavy wheeled vehicles passing forwardly thereacross, said loading platform comprising a main platform having the end thereof first crossed by the forwardly approaching vehicles being pivotally mounted in said pit for permitting raising the main platform from said normal horizontal position in the roadway after a vehicle has passed forwardly thereacross and stopped on said roadway adjacent the opposite end of said main platform, to an adjustable inclined elevated position adjacent the rear end of the stopped vehicle, said loading platform also comprising an auxiliary platform slideably carried by said opposite end of said main platform and adapted to be adjustably longitudinally extended therefrom to bridge any gap between the main platform and the rear end of the stopped vehicle, means operatively connected to said loading platform for pivotally raising the same a desired amount from a horizontal position in the roadway to an adjustable inclined elevated position corresponding substantially to the height of the cargo bed of the stopped vehicle, means operatively connected to said auxiliary platform for adjustably extending the same longitudinally outwardly beyond the main platform to bridge any gap between the main platform and the stopped vehicle, fencing provided along opposite sides of said main platform to facilitate directing the animals along the platform during loading or unloading, a plurality of fenced animal pens located adjacent said loading platform, and fencing defining a path between said loading platform and said animal pens and being adapted for directing animals between the loading platform and the animal pens.

14. Apparatus according to claim 13 wherein gate means is provided in the fencing between said loading platform and said animal pens, said gate means being located across the roadway approaching said loading platform and being adapted for being opened to permit a vehicle to approach and cross said loading platform and for being closed to block the roadway and direct animals between the loading platform and the animal pens.

15. Apparatus according to claim 13 wherein a roof is provided over said animal pens and said loading platform for providing a sheltered area for loading and unloading the animals.

16. Apparatus for facilitating the loading and unloading of animals from wheeled vehicles stopped in a roadway, said apparatus comprising a loading platform positioned in the roadway and across which vehicles are adapted to pass, said loading platform comprising a main platform having one end thereof pivotally mounted for permitting raising the platform from a horizontal position in the roadway after a vehicle has passed thereacross and stopped adjacent thereto, to an inclined position adjacent the rear end of the stopped vehicle, said loading platform also comprising an auxiliary platform slideably carried by the other end of said main platform and adapted for being longitudinally extended therefrom to bridge any gap between the main platform and the rear end of the stopped vehicle, means operatively connected to said loading platform for pivotally raising the same a desired amount from a horizontal position in the roadway to an inclined elevated position corresponding substantially to the height of the cargo bed of the stopped vehicle, means operatively connected to said auxiliary platform for extending the same longitudinally outwardly beyond the main platform to bridge any gap between the main platform and the stopped vehicle, fencing provided along opposite sides of said main platform to facilitate directing the animals along the platform during loading or unloading, said fencing along said main platform comprising a plurality of spaced apart upstanding post members and a plurality of longitudinally extending hollow tubular rail members interconnecting adjacent post members, fencing provided along opposite sides of said auxiliary platform cooperating with the fencing on said main platform for defining continuous fencing along opposite sides of the loading platform, said fencing along said auxiliary platform including a plurality of longitudinally extending rail members telescopically received in the hollow tubular rail members on said main platform, a pair of opposing gates provided adjacent said other end of said main platform, and pivotal mounting means interconnecting said gates and said fencing along said main platform and being adapted for permitting pivotal movement of said gates toward and away from each other to facilitate loading and unloading animals from a variety of types of vehicles.

* * * * *

UNITED STATES PATENT OFFICE
CERTIFICATE OF CORRECTION

PATENT NO. : 3,894,515
DATED : July 15, 1975
INVENTOR(S) : Isom Franklin Plyler

It is certified that error appears in the above-identified patent and that said Letters Patent are hereby corrected as shown below:

IN THE TITLE, "ANDD" should be --AND--

CLAIM 9, Column 8, Lines 36 and 37, "extending" should be --extended--

CLAIM 10, Column 8, Line 65, "the" should be --to--

Signed and Sealed this fourteenth Day of October 1975

[SEAL]

Attest:

RUTH C. MASON
Attesting Officer

C. MARSHALL DANN
Commissioner of Patents and Trademarks